(12) United States Patent
Do (10) Patent No.: US 10,309,126 B2
(45) Date of Patent: Jun. 4, 2019

(54) PAWL LATCH (71) Applicant: Arconic Inc., Pittsburgh, PA (US)

(72) Inventor: Thai Do, Laguna Niguel, CA (US)

(73) Assignee: Arconic Inc., Pittsburgh, PA (US)

( * ) Notice: Subject to any disclaimer, the term of this patent is extended or adjusted under 35 U.S.C. 154(b) by 382 days.

(21) Appl. No.: 15/410,079

(22) Filed: Jan. 19, 2017

(65) Prior Publication Data
US 2017/0211296 A1 Jul. 27, 2017

Related U.S. Application Data (60) Provisional application No. 62/281,335, filed on Jan. 21, 2016.

(51) Int. Cl.
E05B 15/02 (2006.01)
E05B 63/06 (2006.01)
(Continued)

(52) U.S. Cl.
CPC ............. E05B 63/128 (2013.01); B64C 1/14 (2013.01); B64C 1/1407 (2013.01); B64C 1/36 (2013.01);
(Continued)

(58) Field of Classification Search
CPC .... E05B 63/128; E05B 15/0205; E05B 63/06; E05B 65/00; E05B 2015/0235;
(Continued)

(56) References Cited

U.S. PATENT DOCUMENTS 1,206,342 A 11/1916 Linborg
1,929,869 A * 10/1933 Hassner ............... B23B 31/103
279/76
(Continued)

FOREIGN PATENT DOCUMENTS

CN 2115380 U 9/1992
CN 1142258 A 2/1997
(Continued)

OTHER PUBLICATIONS

Aerospace Latching Systems, Alcoa Fastening Systems, http://www.alcoa.com/fastening_systems/aerospace/en/product.asp?cat_id=213&prod_id=500,pp. I1-I2, 159-160, and i-iii (8 pages).
(Continued)

Primary Examiner — Kristina R Fulton
Assistant Examiner — Thomas L Neubauer
(74) Attorney, Agent, or Firm — Greenberg Traurig, LLP (57) ABSTRACT A pawl latch having a pin assembly with a pin and a receiver assembly adapted to receive the pin assembly. The receiver assembly includes a receiver housing having a slider positioned slidably on the receiver housing, a cam rotatably mounted in the receiver housing, and a link connecting the cam and the slider. Rotating the cam moves the slider along the receiver housing. The receiver assembly includes a pawl and a stop, each having arms, respectively, that rotate. When the receiver assembly receives the pin assembly, contacts the arms of the stop and facilitates their rotation, in which the cam is enabled to be rotated and, in turn, facilitates movement of the slider. The arms of the pawl are rotated in order to lock the pin head of the pin assembly within the receiver assembly.

11 Claims, 13 Drawing Sheets (51) Int. Cl.

| | |
|---|---|
| *E05B 63/12* | (2006.01) |
| *B64C 1/14* | (2006.01) |
| *B64D 29/08* | (2006.01) |
| *E05B 65/00* | (2006.01) |
| *B64C 1/36* | (2006.01) |
| *B64D 29/06* | (2006.01) |
| *B64D 29/00* | (2006.01) |
| *E05B 63/00* | (2006.01) |

(52) U.S. Cl.
CPC .......... *B64D 29/06* (2013.01); *B64D 29/08* (2013.01); *E05B 15/0205* (2013.01); *E05B 63/06* (2013.01); *E05B 65/00* (2013.01); *B64D 29/00* (2013.01); *E05B 2015/0235* (2013.01); *E05B 2063/0026* (2013.01)

(58) Field of Classification Search
CPC . E05B 2063/0026; B64C 1/1407; B64C 1/36; B64C 1/14; B64D 29/06; B64D 29/08; B64D 29/00
USPC ............... 292/252, 253, 14, 18, 152, 153; 43/DIG. 3, DIG. 4, DIG. 14
See application file for complete search history.

(56) References Cited

U.S. PATENT DOCUMENTS

| | | |
|---|---|---|
| 2,104,838 A | 1/1938 | Leonard |
| 2,712,955 A | 7/1955 | Andrews |
| 2,726,889 A | 12/1955 | Lawson |
| 2,904,141 A | 9/1959 | Henrichs |
| 2,927,812 A | 3/1960 | Smith et al. |
| 2,944,848 A | 7/1960 | Mandolf |
| 3,070,395 A | 12/1962 | Morrison et al. |
| 3,259,411 A | 7/1966 | Griffiths |
| 3,259,412 A | 7/1966 | Wheeler |
| 3,341,239 A | 9/1967 | Wheeler |
| 3,347,578 A | 10/1967 | Sheehan et al. |
| 3,473,693 A | 10/1969 | Fritz |
| 3,917,327 A | 11/1975 | Plasko |
| 4,053,177 A | 10/1977 | Stammreich et al. |
| 4,099,751 A | 7/1978 | Poe et al. |
| 4,116,479 A | 9/1978 | Poe |
| 4,130,307 A | 12/1978 | Poe et al. |
| 4,183,564 A | 1/1980 | Poe |
| 4,220,364 A | 9/1980 | Poe |
| 4,478,446 A | 10/1984 | Duran |
| RE31,935 E | 7/1985 | Poe |
| 4,530,529 A | 7/1985 | Poe et al. |
| 4,538,843 A | 9/1985 | Harris |
| 4,602,812 A | 7/1986 | Bourne |
| 4,641,868 A | 2/1987 | Miron |
| 4,826,221 A | 5/1989 | Harmon |
| 4,828,299 A | 5/1989 | Poe |
| 4,858,970 A | 8/1989 | Tedesco et al. |
| 4,911,488 A | 3/1990 | Brackmann et al. |
| 5,152,926 A | 10/1992 | Brown |
| 5,172,945 A | 12/1992 | Doherty et al. |
| 5,228,730 A | 7/1993 | Gokcebay et al. |
| 5,341,752 A | 8/1994 | Hambleton |
| 5,609,373 A | 3/1997 | Gromotka |
| 5,620,212 A | 4/1997 | Bourne et al. |
| 5,660,295 A | 8/1997 | Hroma et al. |
| 5,664,813 A | 9/1997 | Gromotka |
| 5,765,883 A | 6/1998 | Dessenberger |
| 5,984,382 A | 11/1999 | Bourne et al. |
| 5,992,908 A | 11/1999 | Yared et al. |
| 6,123,370 A | 9/2000 | Rozema et al. |
| 6,343,815 B1 | 2/2002 | Poe |
| 6,361,090 B1 | 3/2002 | Fan |
| 6,513,841 B1 | 2/2003 | Jackson |
| 6,755,448 B2 | 6/2004 | Jackson et al. |
| 6,913,297 B2 | 7/2005 | Jackson et al. |
| 7,029,038 B2 | 4/2006 | Kobrehel |
| 7,156,429 B2 | 1/2007 | Erikson |
| 7,504,601 B2 | 3/2009 | Belmond et al. |
| 7,857,362 B2 | 12/2010 | Deblock |
| 8,479,543 B2 | 7/2013 | Yang et al. |
| 8,646,819 B2 | 2/2014 | Do et al. |
| 8,727,390 B2 | 5/2014 | Do |
| 8,864,185 B2 | 10/2014 | Do |
| 9,353,559 B2 | 5/2016 | Fabre et al. |
| 2002/0000726 A1 | 1/2002 | Zintler |
| 2002/0060459 A1 | 5/2002 | Zintler |
| 2003/0213095 A1 | 11/2003 | Jackson |
| 2005/0087996 A1 | 4/2005 | Jackson et al. |
| 2006/0214431 A1 | 9/2006 | Helsley et al. |
| 2007/0170730 A1 | 7/2007 | Hall |
| 2008/0129056 A1 | 6/2008 | Hernandez et al. |
| 2011/0109103 A1 | 5/2011 | Huston et al. |
| 2011/0227350 A1 | 9/2011 | Do |
| 2012/0102842 A1 | 5/2012 | Fournie et al. |
| 2012/0151724 A1 | 6/2012 | DeFrance et al. |
| 2012/0242096 A1 | 9/2012 | Rozema |
| 2012/0242097 A1 | 9/2012 | Hernandez |
| 2013/0043350 A1 | 2/2013 | DeFrance et al. |
| 2015/0184543 A1 | 7/2015 | Fabre et al. |
| 2015/0184544 A1 | 7/2015 | Fabre et al. |

FOREIGN PATENT DOCUMENTS

| | | | |
|---|---|---|---|
| CN | 101002031 A | 7/2007 | |
| CN | 206503451 U | 9/2017 | |
| DE | 202220 C | 9/1908 | |
| DE | 29807738 U1 | 7/1998 | |
| DE | 20 2014 103 252 U1 | 11/2015 | |
| DE | 201420103252 | * 11/2015 | ............ E05B 85/00 |
| EP | 1091059 A2 | 4/2001 | |
| EP | 2031157 A1 | 3/2009 | |
| EP | 2148027 A1 | 1/2010 | |
| EP | 2444575 A1 | 4/2012 | |
| EP | 2551199 A1 | 1/2013 | |
| EP | 2674362 A1 | 12/2013 | |
| FR | 2397503 A1 | 2/1979 | |
| FR | 2852049 A1 | 9/2004 | |
| GB | 191493 A | 1/1923 | |
| GB | 683445 | 11/1952 | |
| GB | 1497982 A | 1/1978 | |
| GB | 1537410 A | 12/1978 | |
| WO | 2006096600 A3 | 2/2007 | |
| WO | 2010033026 A1 | 3/2010 | |
| WO | 2010149905 A1 | 12/2010 | |
| WO | 2011069103 A1 | 6/2011 | |
| WO | 2012096986 A1 | 7/2012 | |

OTHER PUBLICATIONS

Fairchild Fasteners, Aerospace Mechanisms, "RAM™ Aerospace Latch Mechanism", 2000 (4 pages).
Rotary Latch #TL18261, Alcoa Fastening Systems, Mar. 2005 (1 page).
English-language translation of WO 2010/149905 A1 (8 pages).
International Search Report and Written Opinion dated Jul. 20, 2012, issued by the European Patent Office in connection with International Patent Application No. PCT/US2012/028418 entitled "Pin Latch Having Intermediate Position" (13 pages).
International Search Report and Written Opinion dated Jan. 18, 2013, issued by the European Patent Office in connection with International Patent Application No. PCT/US2012/059206 entitled "Rotary-Handle Latch" (9 pages).
International Search Report and Written Opinion dated Feb. 25, 2013, issued by the European Patent Office in connection with International Patent Application No. PCT/US2012/066039 entitled "Pin Latch With Detection Device and Movable Catch-Pin and Intermediate Position With Automatic Return Mechanism" (15 pages).
International Search Report and Written Opinion dated Dec. 29, 2011, issued by the European Patent Office in connection with International Patent Application No. PCT/US2011/027871 entitled "Latch With Adjustable Handle" (17 pages).

(56) References Cited

OTHER PUBLICATIONS

International Search Report and Written Opinion dated Jul. 15, 2011, issued by the European Patent Office in connection with International Patent Application No. PCT/US2011/027671 entitled "Latch With Adjustable Handle" (8 pages).
International Search Report and Written Opinion dated Jun. 7, 2011, issued by the European Patent Office in connection with International Patent Application No. PCT/US2011/024031 entitled "Side-Driven Action Pin Latch" (9 pages).
International Search Report and Written Opinion dated Jun. 9, 2016, issued by the European Patent Office in connection with International Patent Application No. PCT/US2016/024836 (13 pages).
Alcoa Fastening Systems, Document TL22028 Rev. P, dated Jun. 18, 2015 (2 pages).
International Search Report and Written Opinion dated Oct. 18, 2016, issued by the European Patent Office in connection with International Patent Application No. PCT/US2016/048274 entitled "Adjustable Pressure Relief Latch" (12 pages).
Camloc/Ram, "Adjustable Hook Latches" (2 pages).
International Search Report and Written Opinion dated Oct. 28, 2016, issued by the European Patent Office in connection with International Patent Application No. PCT/US2016/044811 entitled "Pressure Relief Latch" (13 pages).
Alcoa Fastening Systems, Document TL22013 Rev. K, dated Jul. 13, 2015 (2 pages).
Alcoa Fastening Systems, Document TL18356 Rev. D, dated Jul. 7, 2015 (2 pages).
International Search Report and Written Opinion dated Jun. 7, 2011, issued by the European Patent Office in connection with International Patent Application No. PCT/US2011/024031 entitled "Side-Driven Action Pin Hatch" (9 pages).
International Search Report and Written Opinion dated Apr. 21, 2017, issued by the European Patent Office in International Application No. PCT/US2017/014079 (12 pages).

\* cited by examiner

PAWL LATCH

CROSS-REFERENCE TO RELATED APPLICATION

This application is a § 111(a) application that relates to and claims the benefit of commonly-owned, U.S. Provisional Patent Application Ser. No. 62/281,335, filed Jan. 21, 2016, entitled "PAWL LATCH SYSTEM," the entirety of which is incorporated herein by reference.

FIELD OF THE INVENTION

The present invention relates to latches and, more particularly, to pawl latches.

BACKGROUND OF THE INVENTION

Removable and moveable elements installed on exterior surfaces of aerospace vehicles, such as hatches, doors, access panels, engine cowlings, nacelles, and radomes employ latches.

SUMMARY OF THE INVENTION

In an embodiment, a pawl latch having a pin assembly including a pin housing having a first end and a second end opposite the first end, and a pin extending from the first end of the pin housing and having a pin head; and a receiver assembly including, a receiver housing having a first end, a second end opposite the first end of the receiver housing, a cavity extending from the first end of the receiver housing to a location intermediate the first and second ends of the receiver housing, a slider positioned slidably on the receiver housing, such that the slider is moveable along a longitudinal axis of the receiver housing between a first position, in which the slider is positioned proximate to the second end of the receiver housing, and a second position, in which the slider is positioned proximate to the first end of the receiver housing, a cam having an arm, and a link connecting the cam and the slider to one another, the cam being positioned rotatably at the second end of the receiver housing, such that the cam is moveable rotatably from a first position, in which the arm of the cam extends outwardly and away from the second end of the receiver housing when the slider is in its first position, and a second position, in which the arm of the cam extends inwardly toward the second end of the receiver housing when the slider is in its second position, a pawl positioned within the receiver housing proximate to the first end of the receiver housing, the pawl including a plurality of arms, each of the plurality of arms being moveable rotatably from a first position, in which a portion of the arm extends outwardly from the housing, and a second position, in which the portion of the arm is positioned within the housing, a stop positioned within the receiver housing intermediate the first and second ends of the receiver housing, the stop including a plurality of arms, each of the plurality of arms of the stop being moveable rotatably from a first position, in which the arm is positioned within the housing, and a second position, in which one end of the arm extends outwardly from the housing, wherein the receiver assembly is adapted to receive the pin assembly such that the cavity of the receiver housing of the receiver assembly is sized and shaped to receive and mate with the pin of the pin assembly, wherein when the receiver assembly receives the pin assembly, the pin head of the pin contacts the plurality of arms of the stop of the receiver assembly and facilitates the rotation of the plurality of arms of the stop from their first position to their second position, and the cam is enabled to be rotated from its first position to its second position which, in turn, facilitates movement of the slider from its first position to its second position, and the arms of the pawl are rotated from their first position to their second position in order to lock the pin head of the pin assembly within the receiver assembly. In an embodiment, when at least one of the plurality of arms of the stop of the receiver assembly is in its first position, the slider is prevented from moving from its first position to its second position.

In an embodiment, the pin assembly includes a star wheel mated rotatably with the pin to adjust the axial travel of the pin along a longitudinal axis of the pin assembly. In an embodiment, the pin housing includes a slot for accessing the star wheel, and the star wheel includes a periphery having a plurality of holes for receiving an external tool for rotating the star wheel. In an embodiment, the pin housing includes a plurality of balls engaged with the star wheel, and a plurality of springs engaged with the plurality of balls for spring-loading the star wheel.

In an embodiment, the pawl includes a first plurality of springs, each of which is engaged with a corresponding one of the plurality of arms of the pawl and maintains the corresponding one of the plurality of arms of the pawl in its first position and facilitates rotation of the arm from its second position to its first position. In an embodiment, the stop includes a second plurality of springs, each of which is engaged with a corresponding one of the plurality of arms of the stop and maintains the corresponding one of the plurality of arms of the stop in its first position and facilitates rotation of the arm from its second position to its first position. In an embodiment, the receiver housing includes a cone located at the first end thereof.

In an embodiment, the receiver housing includes a plurality of a pair of beams spaced apart from one another, and wherein each of the plurality of arms of the pawl is positioned between a corresponding one of the plurality of the pair of beams, and wherein each of the plurality of arms of the stop is positioned between a corresponding one of the plurality of the pair of beams. In an embodiment, the receiver housing includes a bearing located at the second end thereof, and the cam is movable rotatably about the bearing. In an embodiment, the pin housing includes a bearing located at the second end thereof and is adapted to receive an external closing mechanism.

In an embodiment, the arms of the pawl are rotated in order to lock the pin head of the pin assembly within the receiver assembly, while the arms of the stop provide a safety feature such they prevent axial movement of the slider, and, thus, rotation of the cam if the pin is not full engaged with the stop of the receiver assembly. This provides a visual indication that an associated door of an external structure is not closed.

In an embodiment, the pawl latch is remotely closed by an external mechanism when either half of a door system is rotated, causing the pin assembly to come into contact with the receiver assembly, and thus guide and continue sliding into the receiver until the pin is fully retained. In an embodiment, the pawl latch is adapted for use in the aerospace field, such as aerospace doors, nacelles, etc. In other embodiments, the pawl latch can be used in other fields and applications.

DETAILED DESCRIPTION OF THE DRAWINGS

Figure 1:
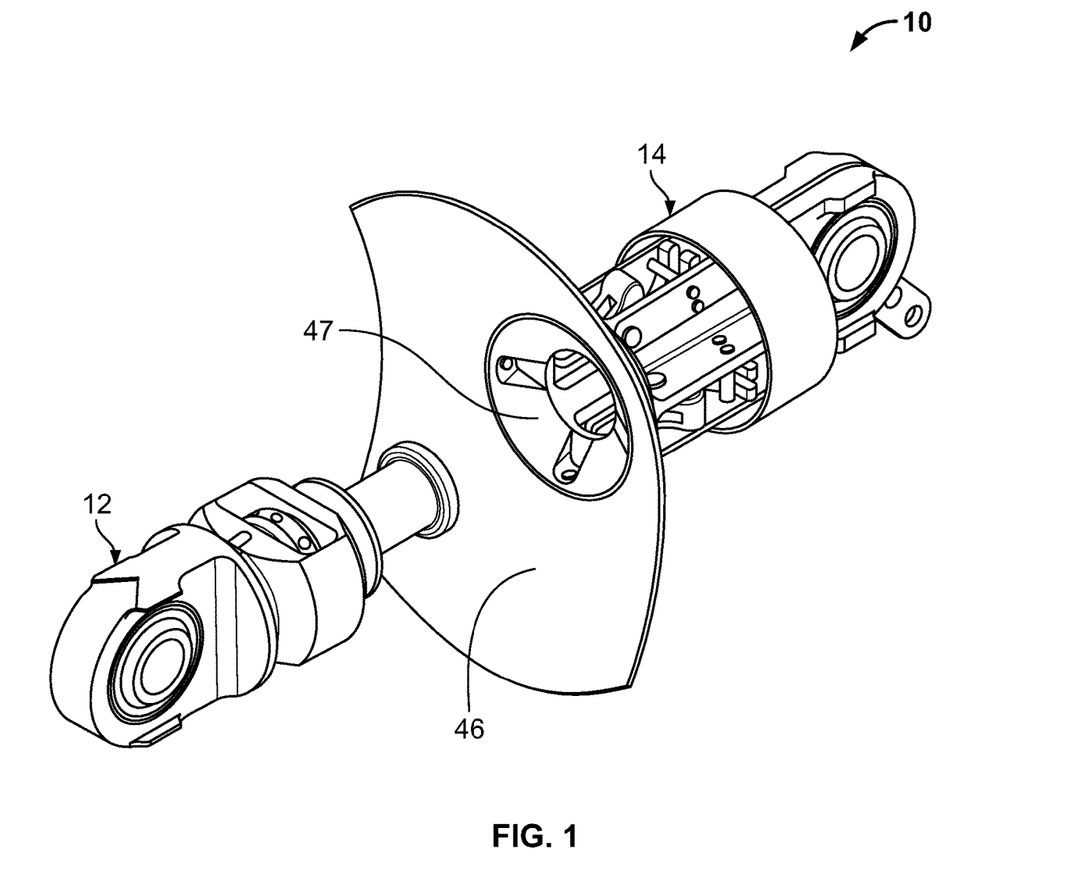
FIG. 1 is a front, top perspective view of a pawl latch in accordance with an embodiment.
Figure 2:
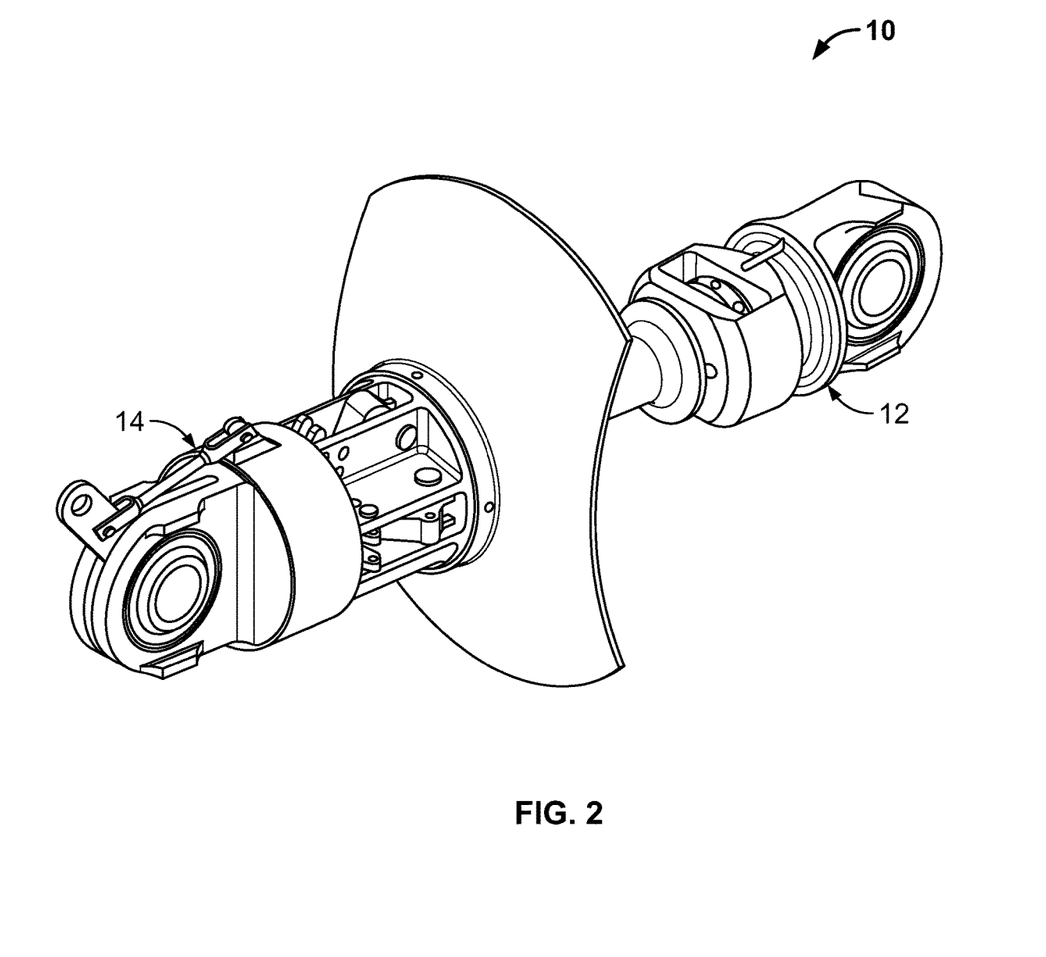
FIG. 2 is a rear, bottom perspective view of the pawl latch shown in FIG. 1.

Referring to FIGS. 1 and 2, in an embodiment, a pawl latch 10 includes a pin assembly 12 and a receiver assembly 14 that receives slidably the pin assembly 12. As will be discussed in further detail below, the pawl latch 10 may be remotely closed when the pin assembly 12 comes into contact with the receiver assembly 14. In an embodiment, the pin assembly 12 is guided and slides into the receiver assembly 14 until a pin of the pin assembly 12 is fully retained in the receiver assembly 14.

Figure 3:
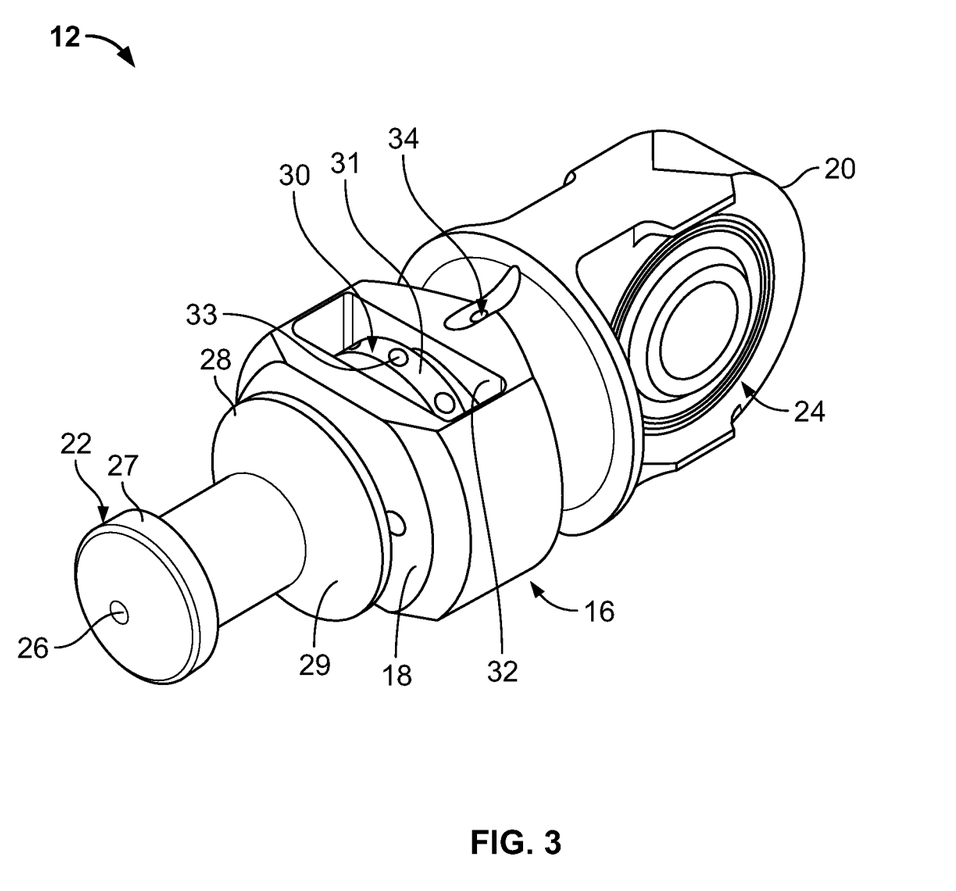
FIG. 3 is a front perspective view of a pin assembly employed by the pawl latch shown in FIG. 1.
Figure 4A:
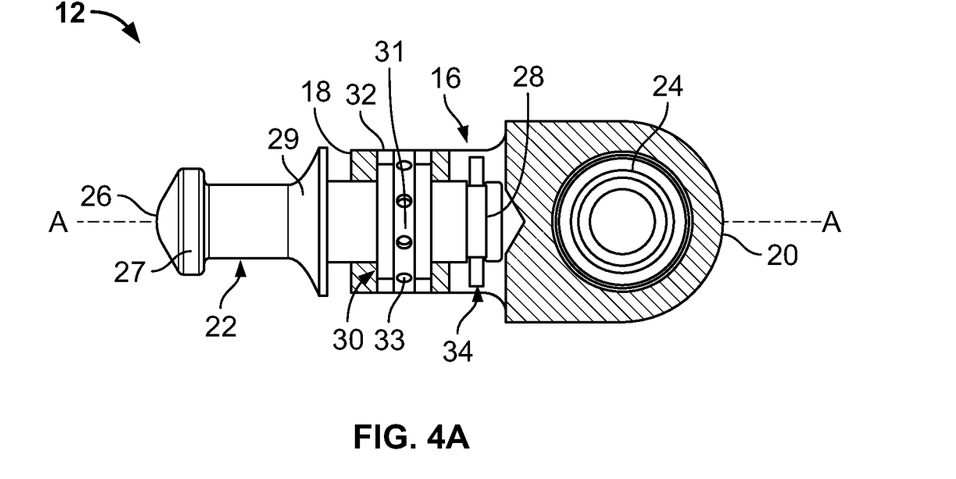
FIGS. 4A and 4B are side and top cross-sectional views, respectively, of the pin assembly shown in FIG. 3.
Figure 4B:
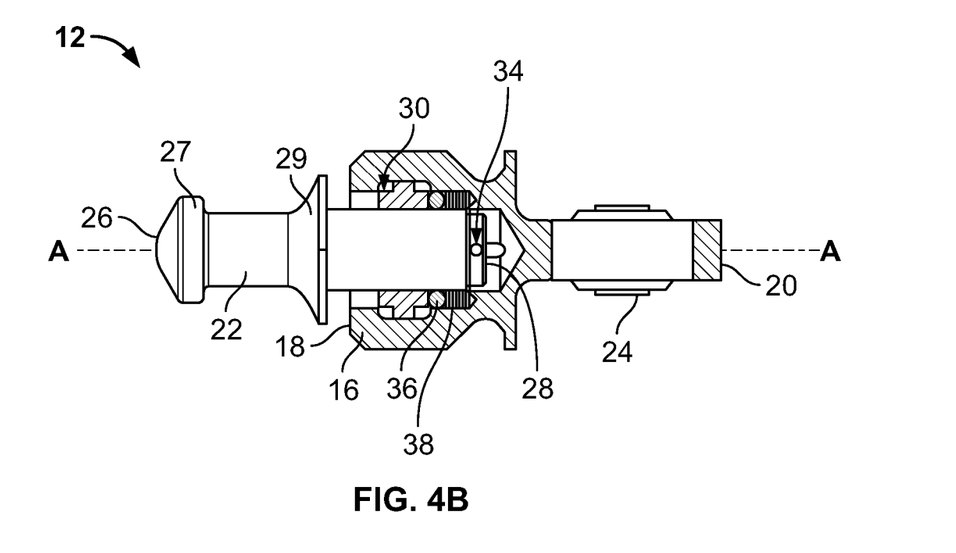

Referring to FIGS. 3, 4A and 4B, in an embodiment, the pin assembly 12 includes a pin housing 16 having a first end 18, a second end 20 opposite the first end 18, a pin 22 extending from the first end 18, and a bearing 24 embedded within the second end 20 of the pin housing 16. In an embodiment, the pin 22 includes a first, exposed end 26 and a second, distal end 28 opposite the exposed end 26. In an embodiment, the pin 22 includes a head 27 located at the first end 26 and frusto-conical-shaped base 29 located intermediate the first and second ends 26, 28. In an embodiment, a star wheel 30 is positioned within the pin housing 16 and mates rotatably with the pin 22 at the second end 28 thereof. In an embodiment, a portion of a periphery 31 of the star wheel 30 is exposed through a slot 32 that is formed within the pin housing 16. In an embodiment, the slot 32 is rectangular in shape, but can consist of other shapes and sizes. In an embodiment, the periphery 31 of the star wheel 30 includes a plurality of holes 33 each of which are spaced apart peripherally from one another. In an embodiment, the pin 22 mates threadedly with the star wheel 30 and is guided by a guide pin 34 positioned and inserted through the second end 28 of the pin 22. In an embodiment, the star wheel 30 is loaded by a plurality of balls 36 and a plurality of springs 38, which are contained in the pin housing 16 to provide an anti-rotation feature of the star wheel 30 (see FIG. 4B). In an embodiment, the axial travel of the pin 22 along a longitudinal axis A-A is adjustable by rotating the star wheel 30 in either a clockwise or counterclockwise direction. In an embodiment, rotation of the star wheel 30 is implemented with a standard tool that is inserted through the slot 32 and engages the holes 33.

Figure 5:
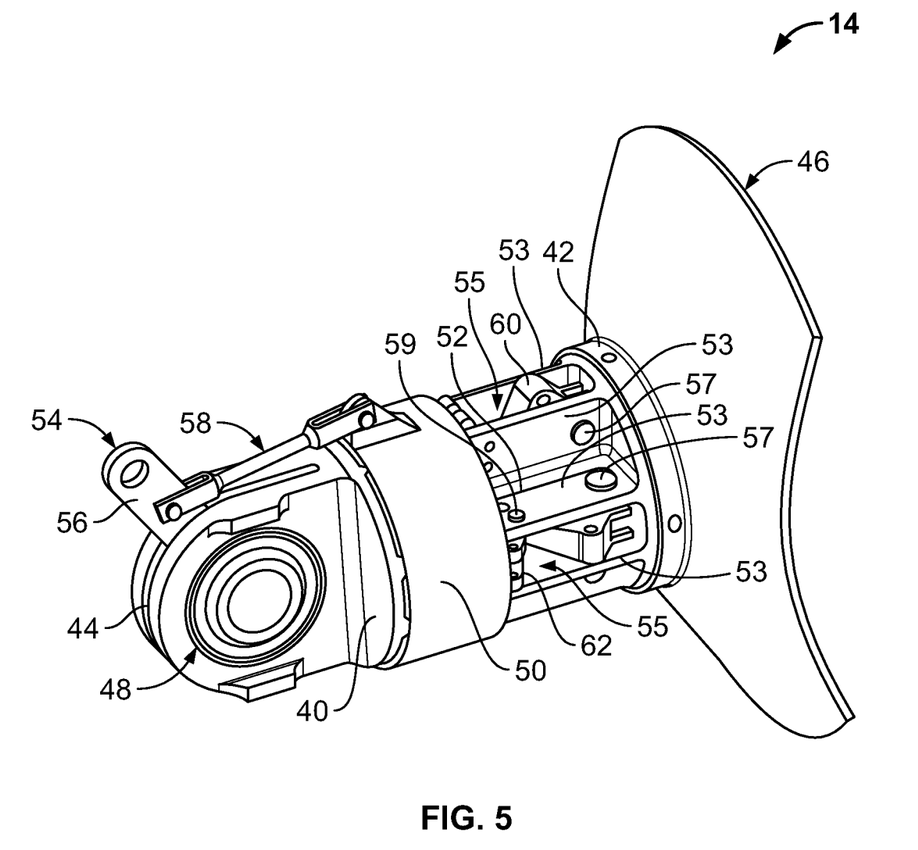
FIG. 5 is a front perspective view of a receiver assembly employed by the pawl latch shown in FIG. 1.
Figure 6:
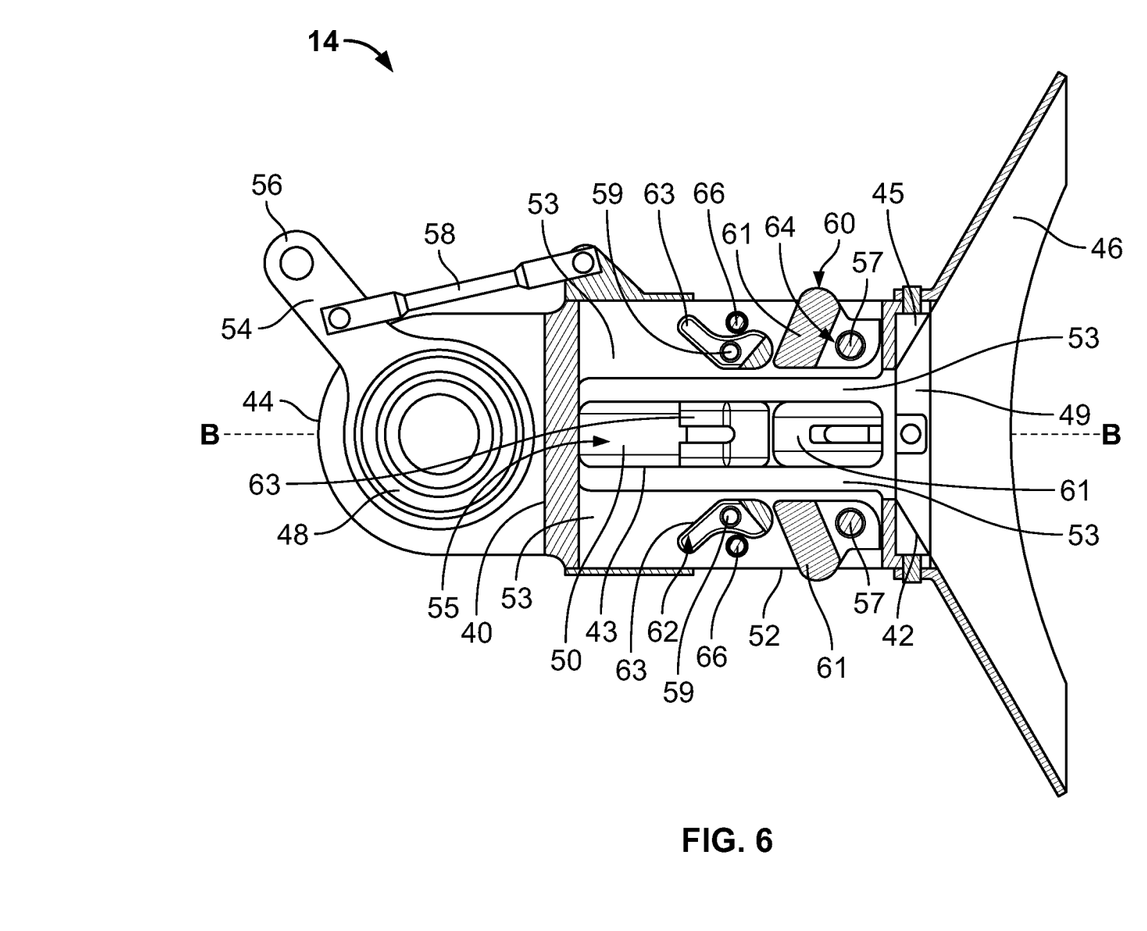
FIG. 6 is a side cross-sectional view of the receiver assembly shown in FIG. 5.

Referring to FIGS. 5 and 6, in an embodiment, the receiver assembly 14 includes a receiver housing 40 having a first end 42 and a second end 44 opposite the first end 42, a cavity 43 extending from the first end 42 to a location intermediate the first and second ends 42, 44 and having an opening 45 located proximate to the first end 42, a concave-shaped cone 46 installed on the first end 42 and having a circular-shaped hole 47 aligned with the opening 45 of the cavity 43 of the receiver housing 40 (not shown in FIG. 5 or 6 but see FIG. 1) and a bearing 48 embedded within the second end 44. In an embodiment, the opening 45 includes a frusto-conical-shaped portion 49 (see FIG. 6). In an embodiment, the portion 49 of the opening 45 is sized and shaped to mate with the base 29 of the pin 22 of the pin assembly 12. In an embodiment, a tubular-shaped slider 50 is positioned slidably and floats on and around a skirt 52 of the receiver housing 40 intermediate the first and second ends 42, 44 thereof. In an embodiment, the skirt 52 includes a plurality of a pair of beams 53, each of the corresponding pair of beams 53 being spaced apart from one another to form a space 55 therebetween. In an embodiment, the plurality of the pairs of beams 53 include four pairs of the beams 53 that are positioned equidistant from one another and radially, such that a cross-shaped cross section is formed. In an embodiment, one of the beams 53 of one of the pair of beams 53 is positioned adjacent and perpendicular to another of the beams 53 of another of an adjacent pair of the beams 53. In an embodiment, the bearing 48 includes a cam 54 having an elongated arm 56, which is connected to the slider 50 by a link 58. In an embodiment, the slider 50 is moveable along a longitudinal axis B-B of the receiver housing 40 between a first position, in which the slider 50 is positioned proximate to the second end 44 of the receiver housing 40, and a second position, in which the slider 50 is positioned proximate to the first end 42 of the receiver housing 40. In turn, the cam 54 is moveable rotatably about the bearing 48 from a first position, in which the arm 56 of the cam 54 extends outwardly and away from the second end 44 of the receiver housing 40 when the slider 50 is in its first position, and a second position, in which the arm 56 of the cam 54 extends inwardly at the second end 44 of the receiver housing 40 when the slider 50 is in its second position.

Still referring to FIGS. 5 and 6, in an embodiment, the receiver assembly 14 includes a pawl 60 positioned proximate to the first end 42 of the receiver housing 40. In an embodiment, the pawl 60 includes a plurality of arms 61 each of which is positioned within a corresponding one of the spaces 55 between a corresponding one of the pair of beams 53. In an embodiment, each of the plurality of arms 61 is attached to the corresponding one of the pair of beams 53 by rivets 57. In an embodiment, and as to be described hereinbelow, each of the plurality of arms 61 of the pawl 60 is moveable rotatably from a first position, in which a portion of the arm 61 extends outwardly from the corresponding one of the pair of beams 53, and a second position, in which such portion of the arm 61 is positioned within the corresponding space 55 and between the corresponding pair of beams 53. In an embodiment, the arms 61 of the pawl 60 are spring-loaded by corresponding springs 64.

Still referring to FIGS. 5 and 6, in an embodiment, a stop 62 is installed pivotably within the receiver housing 40 intermediate the first and second ends 42, 44 of the receiver housing 40. In an embodiment, the stop 62 is positioned intermediate the pawl 60. In an embodiment, the stop 62 includes a plurality of arms 63 each of which is positioned within a corresponding one of the spaces 55 between a corresponding one of the pair of beams 53. In an embodiment, each of the plurality of arms 63 is attached to the corresponding one of the pair of beams 53 by rivets 59. In an embodiment, and as to be described hereinbelow, each of the plurality of arms 63 of the stop 62 is moveable rotatably from a first position, in which one end of the arm 63 extends outwardly from the corresponding one of the pair of beams 53, and a second position, in which such end of the arm 62 is positioned within the corresponding space 55 and between the corresponding pair of beams 53. In an embodiment, the arms 63 of the stop 62 are spring-loaded by corresponding springs 66.

Figure 7:
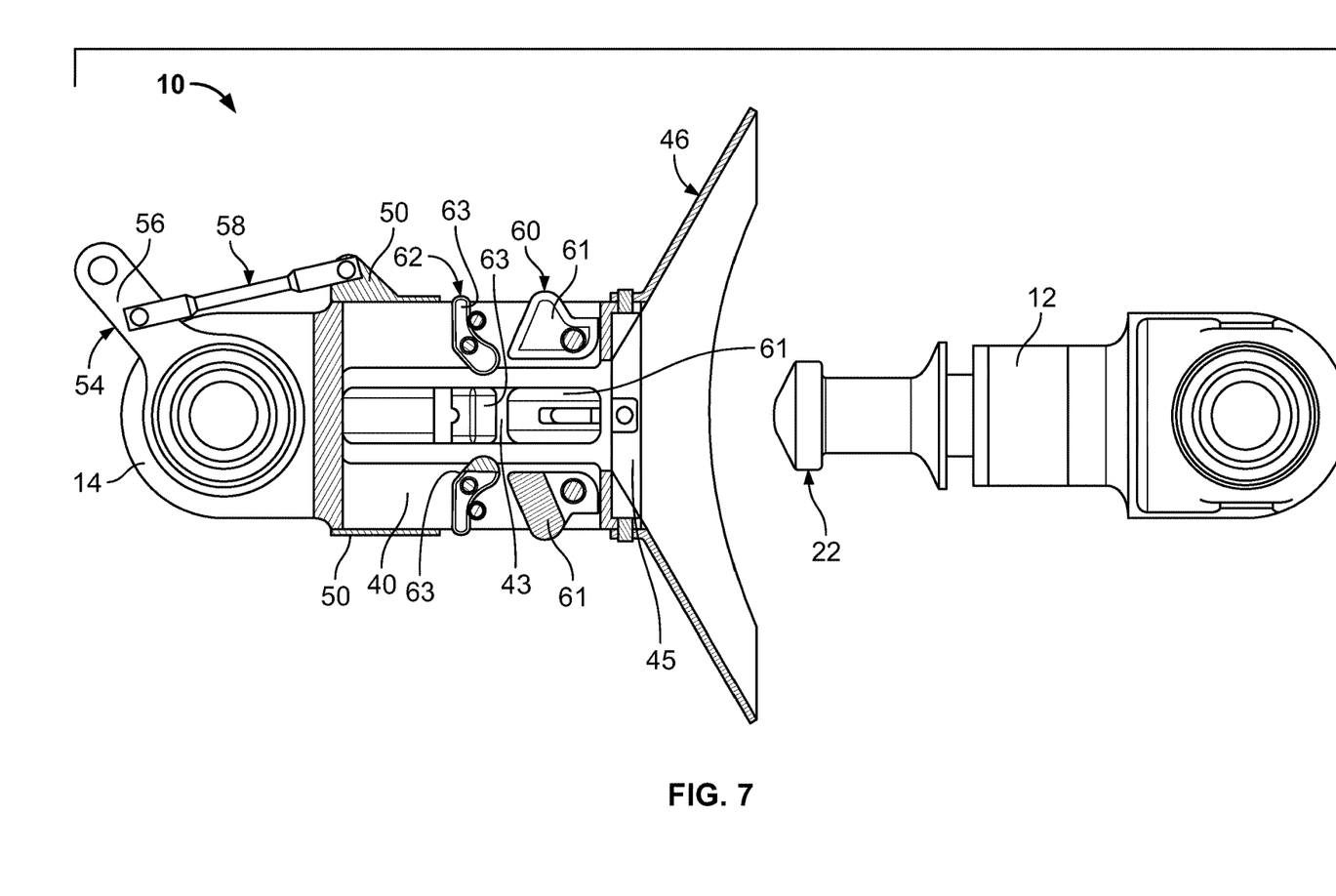
FIGS. 7 through 12 are side cross-sectional views of the pawl latch shown in FIG. 1 showing the steps of a closing sequence.

FIGS. 7 through 12 show a sequence of closing the pawl latch 10. FIG. 7 shows the open position of the pawl latch 10, in which the receiver assembly 14 is in an open position by an external mechanism (not shown in the Figures). When the receiver assembly 14 is in its open position, the slider 50 and the cam 54 of the receiver assembly 14 are each in its first position. In an embodiment, the pin assembly 12 is aligned with the receiver assembly 14 and ready to mate with one another. More particularly, the pin 22 of the pin assembly 12 is aligned with the hole 47 of the cone 46 and the opening 45 of the cavity 43 of the receiver housing 40. In addition, each of the plurality of arms 61 of the pawl 60 is in its first position, while each of the plurality of arms 63 of the stop 62 is in its first position.

Figure 8:
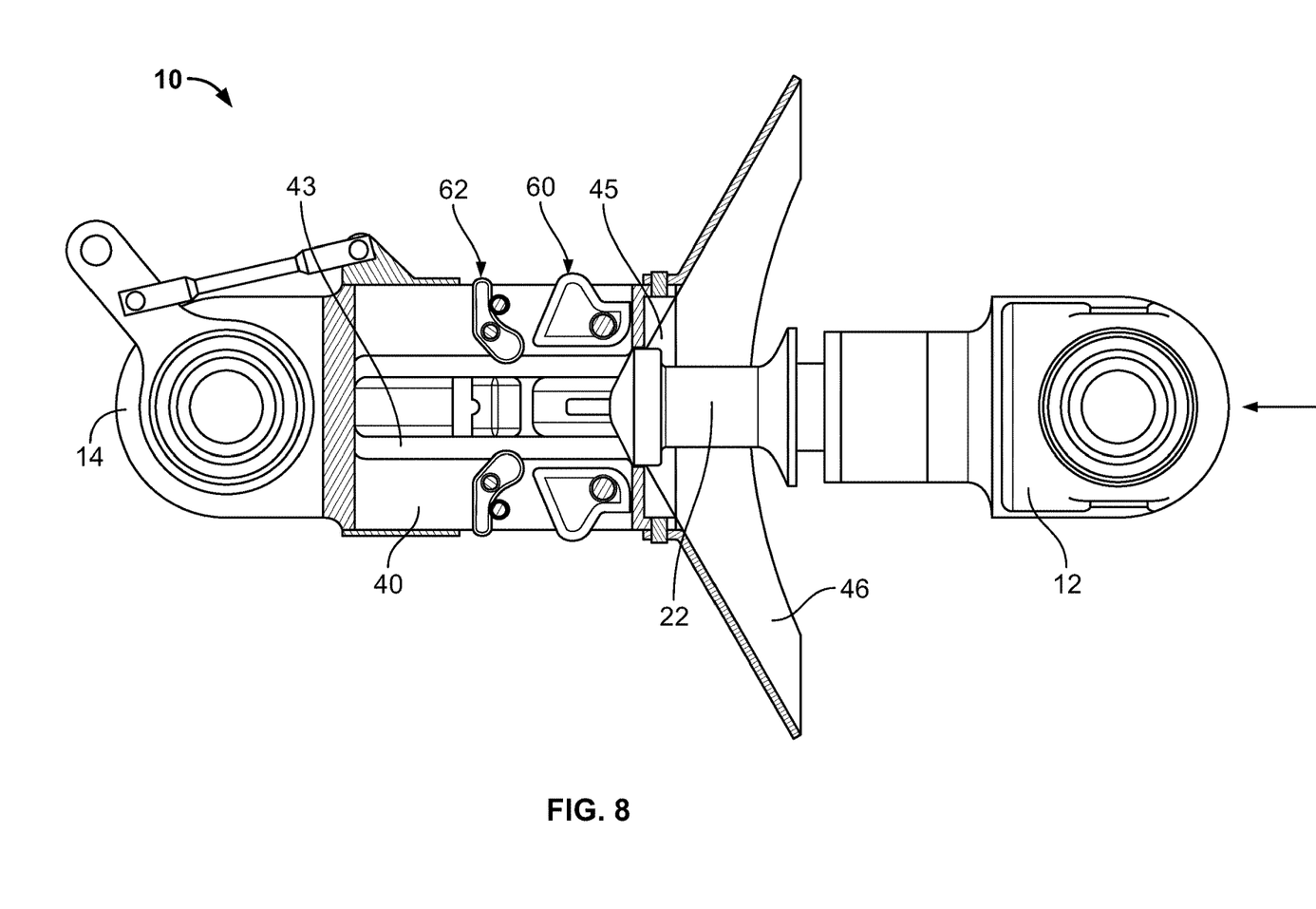
Figure 9:
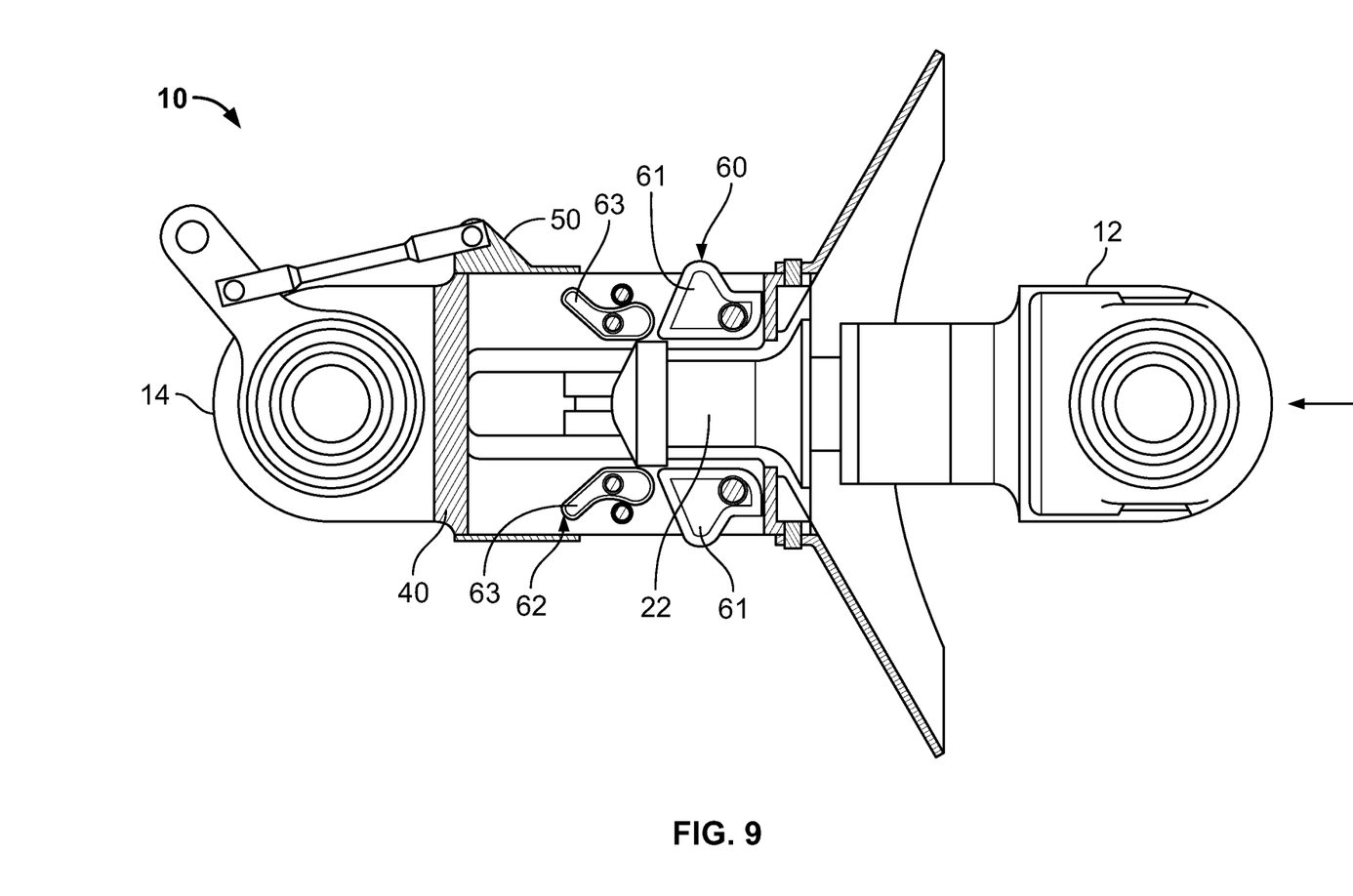
Figure 10:
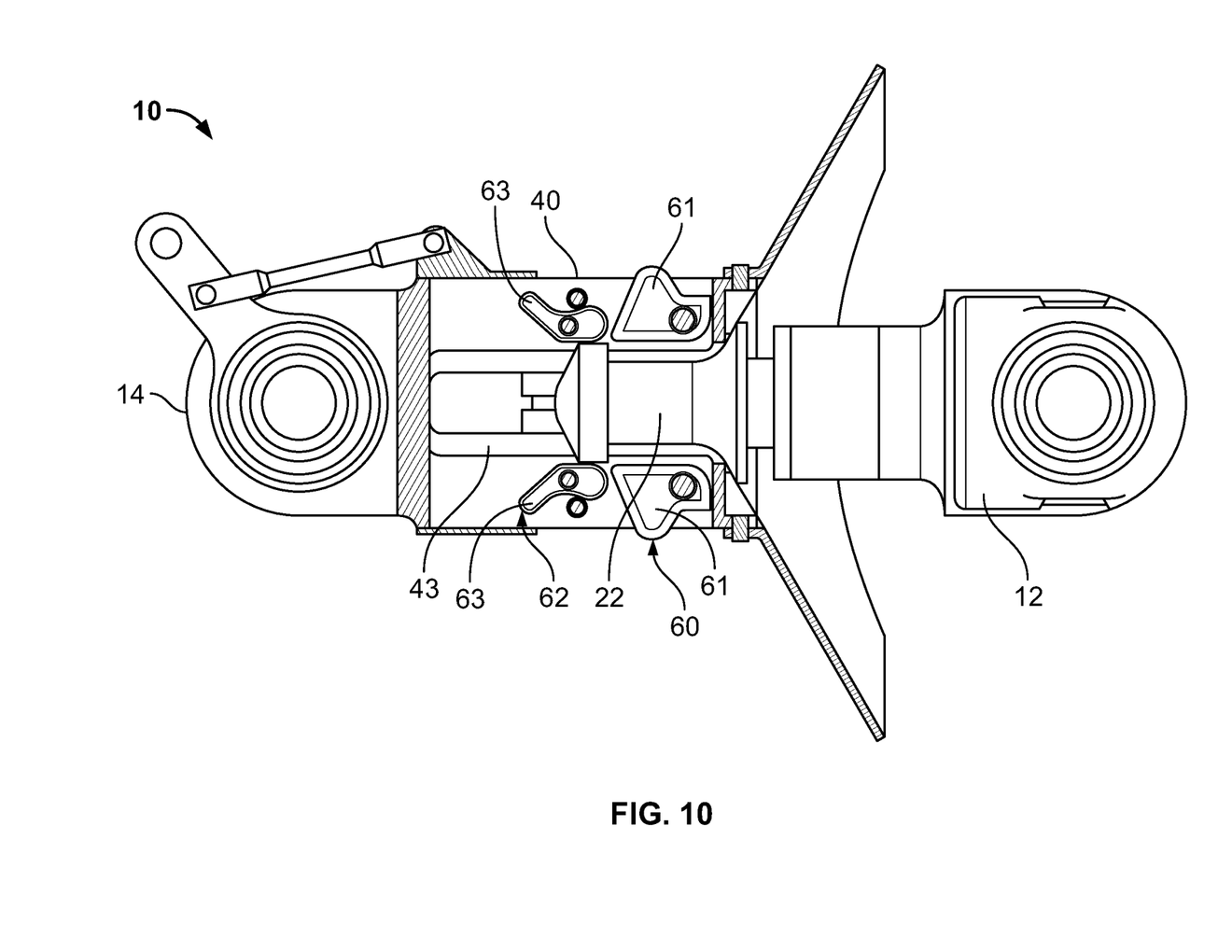

Referring to FIG. 8, the pin assembly 12 is mated with the receiver assembly 14 such that the pin 22 of the pin assembly 12 slides axially into the hole 47 of the cone 46 and into the opening 45 of the cavity 43 of the receiver housing 40. The cone 46 facilitates guidance of the pin 22 of the pin assembly 12 in the event of any misalignment between the pin assembly 12 and the receiver assembly 14. Referring to FIG. 9, the head 27 of the pin 22 contacts the arms 63 of the stop 62 of the receiver housing 40, and the axial movement of the pin 22 against the arms 63 of the stop 62 causes the arms 63 of the stop 62 to rotate from their first position to their second position to clear the arms 63 from the slider 50. Referring to FIG. 10, the pin 22 slides further into the receiver cavity 43 of the receiver housing 40 until the head 27 of the pin 22 clears the pawl 60 and the pin 22 is stopped by and is positioned within the receiver housing 40.

Figure 11:
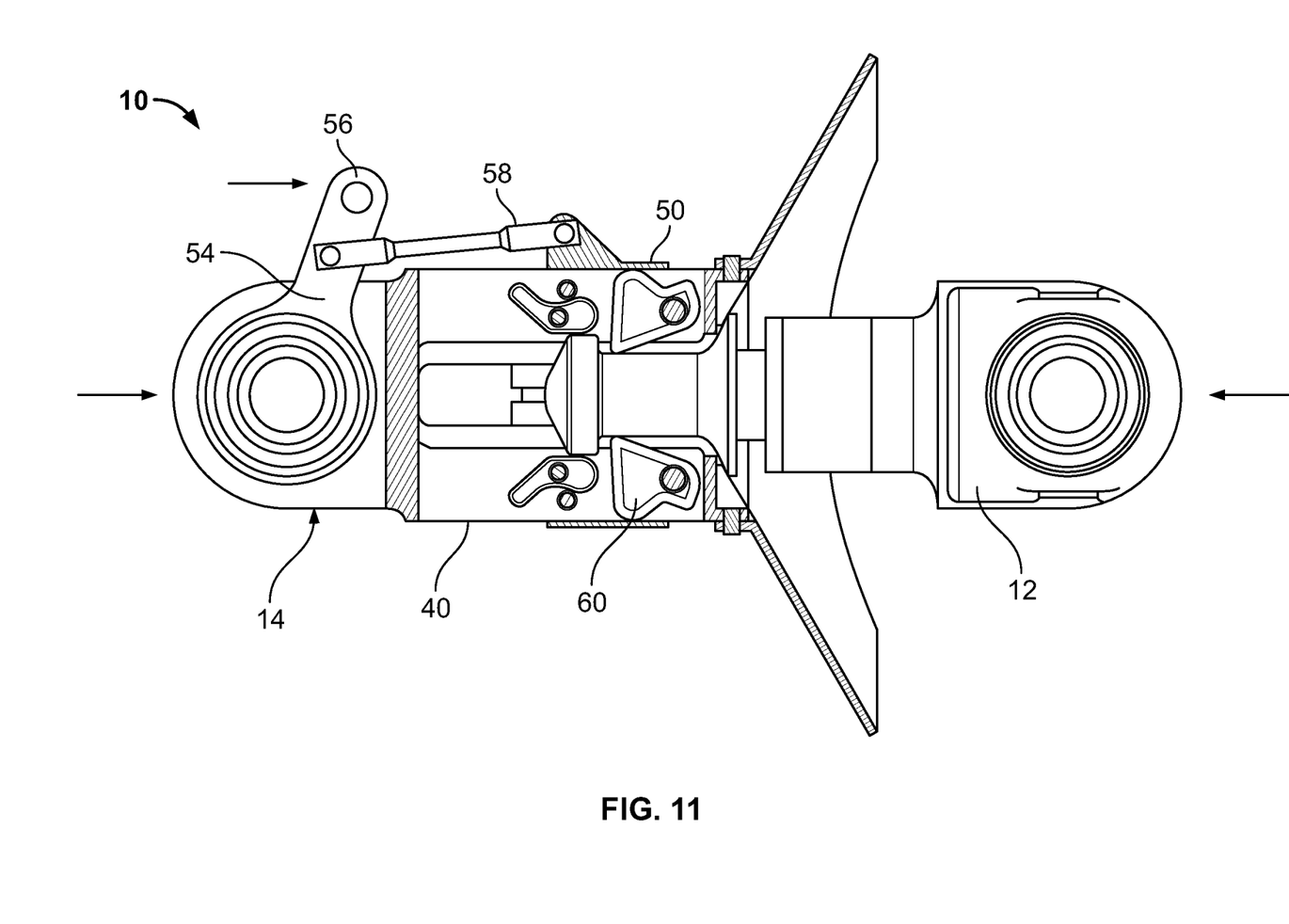
Figure 12:
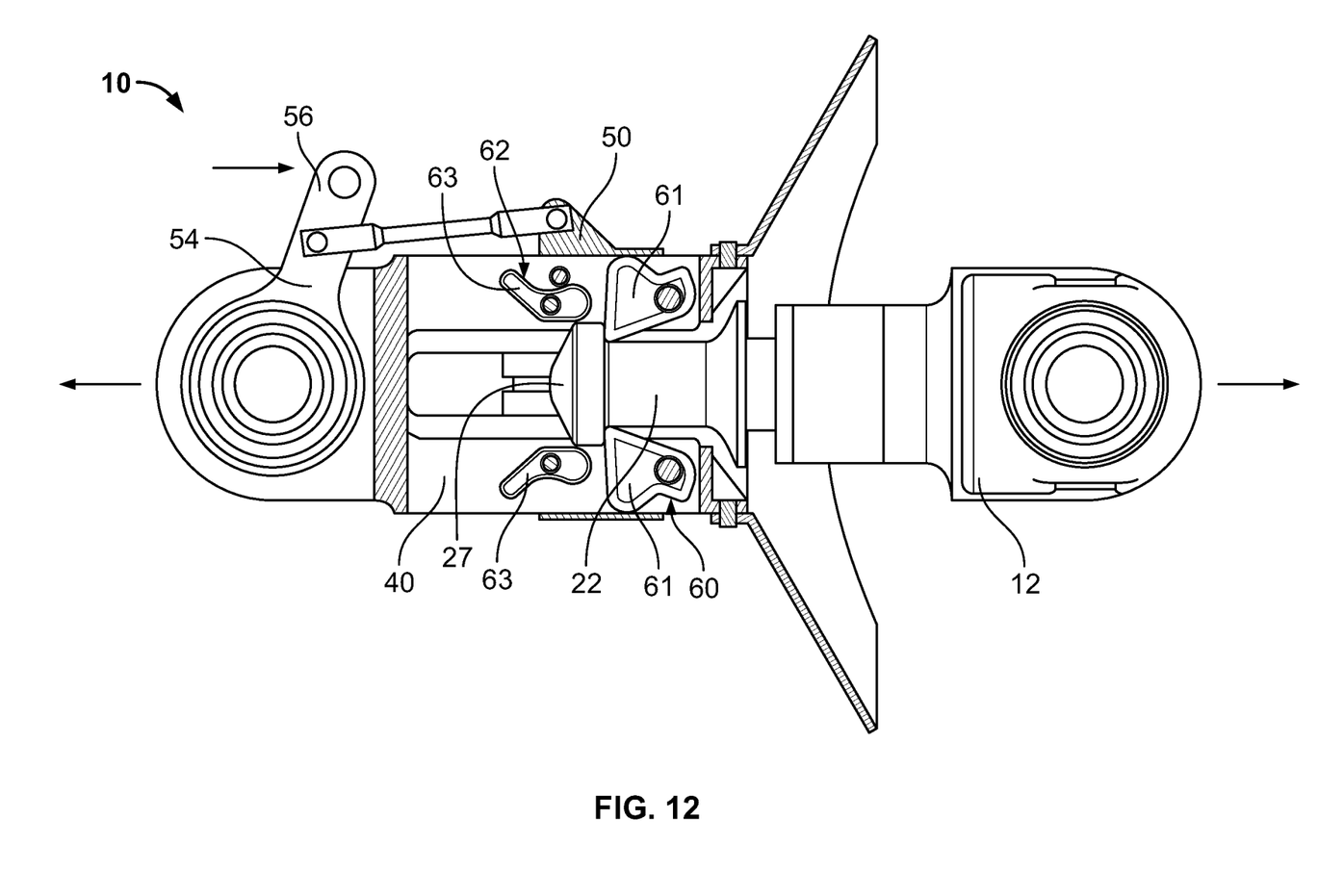

Referring to FIG. 11, when an external mechanism rotates clockwise to a closed position, it pushes and rotates the arm 56 of the cam 54 from its first position to its second positon, which, in turn, pushes the link 58 to move the slider 50 from its first position to its second position. As a result, the slider 50 contacts the arms 61 of the pawl 60 and forces them to rotate inward into the receiver housing 40 from their first position to their second position until the arms 61 of the pawl 60 stop rotating. Referring to FIG. 12, the arms 61 of the pawl 60 are blocked by the slider 50 from rotating outward back to their first position, and the head 27 of the pin 22 is blocked by the arms 61 of the pawl 60 from sliding out of the receiver housing 40. The pawl latch 10 is closed and ready to take on either a compression load or a tension load, as shown in FIGS. 11 and 12.

Figure 13:
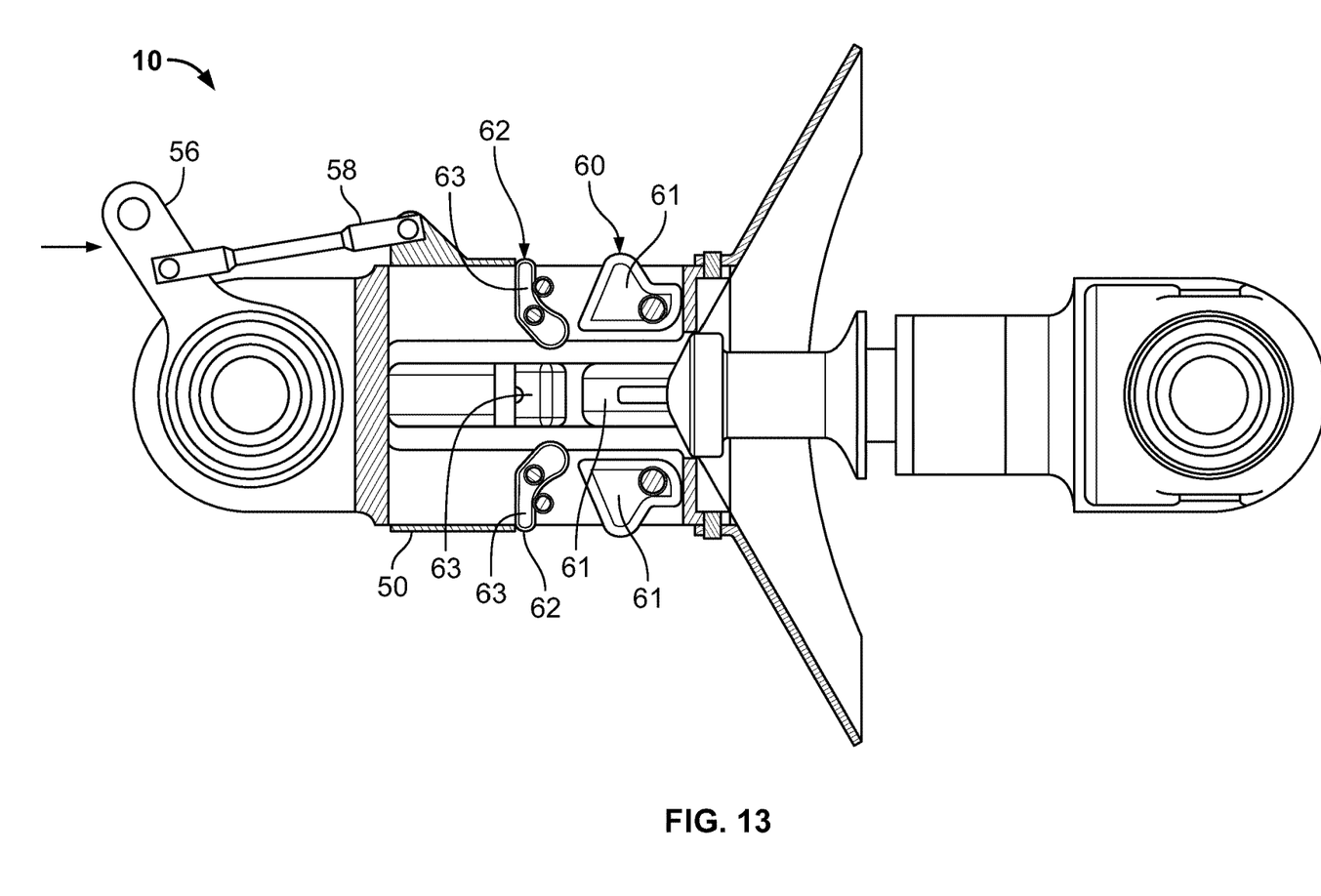
FIG. 13 is a side cross-sectional view of the pawl latch shown in FIG. 1 showing a safety feature of the system.

Referring to FIG. 13, from the open position of the pawl latch 10, if the pin 22 is not fully engaged with the stop 62, the slider 50 will be blocked by the arms 63 of the stop 62 when the external mechanism rotates clockwise to close. This is a safety feature indicating that an associated door is not closed.

To open the pawl latch 10, reverse steps of the sequence described above with respect to FIGS. 7 through 12 are conducted.

It should be understood that the embodiments described herein are merely exemplary and that a person skilled in the art may make many variations and modifications without departing from the spirit and scope of the invention. All such variations and modifications are intended to be included within the scope of the claims.

What is claimed is:

1. A pawl latch, comprising:
    a pin assembly including a pin housing having a first end and a second end opposite the first end, and a pin extending from the first end of the pin housing and having a pin head; and
    a receiver assembly including,
        a receiver housing having a first end, a second end opposite the first end of the receiver housing, a cavity extending from the first end of the receiver housing to a location intermediate the first and second ends of the receiver housing,
        a slider positioned slidably on the receiver housing, such that the slider is moveable along a longitudinal axis of the receiver housing between a first position, in which the slider is positioned proximate to the second end of the receiver housing, and a second position, in which the slider is positioned proximate to the first end of the receiver housing,
        a cam having an arm, and a link connecting the cam and the slider to one another, the cam being positioned rotatably at the second end of the receiver housing, such that the cam is moveable rotatably from a first position, in which the arm of the cam extends outwardly and away from the second end of the receiver housing when the slider is in its first position, and a second position, in which the arm of the cam extends inwardly toward the second end of the receiver housing when the slider is in its second position,
        a pawl positioned within the receiver housing proximate to the first end of the receiver housing, the pawl including a plurality of arms, each of the plurality of arms being moveable rotatably from a first position, in which a portion of the arm extends outwardly from the housing, and a second position, in which the portion of the arm is positioned within the housing,
        a stop positioned within the receiver housing intermediate the first and second ends of the receiver housing, the stop including a plurality of arms, each of the plurality of arms of the stop being moveable rotatably from a first position, in which the arm is positioned within the housing, and a second position, in which one end of the arm extends outwardly from the housing,
    wherein the receiver assembly is adapted to receive the pin assembly such that the cavity of the receiver housing of the receiver assembly is sized and shaped to receive and mate with the pin of the pin assembly,
    wherein when the receiver assembly receives the pin assembly, the pin head of the pin contacts the plurality of arms of the stop of the receiver assembly and facilitates the rotation of the plurality of arms of the stop from their first position to their second position, and the cam is enabled to be rotated from its first position to its second position which, in turn, facilitates movement of the slider from its first position to its second position, and the arms of the pawl are rotated from their first position to their second position in order to lock the pin head of the pin assembly within the receiver assembly.

2. The pawl latch of claim 1, wherein when at least one of the plurality of arms of the stop of the receiver assembly is in its first position, the slider is prevented from moving from its first position to its second position.

3. The pawl latch of claim 2, wherein the pawl includes a first plurality of springs, each of which is engaged with a corresponding one of the plurality of arms of the pawl and maintains the corresponding one of the plurality of arms of the pawl in its first position and facilitates rotation of the arm from its second position to its first position.

4. The pawl latch of claim 3, wherein the stop includes a second plurality of springs, each of which is engaged with a corresponding one of the plurality of arms of the stop and maintains the corresponding one of the plurality of arms of the stop in its first position and facilitates rotation of the arm from its second position to its first position.

5. The pawl latch of claim 2, wherein the receiver housing includes a cone located at the first end thereof.

6. The pawl latch of claim 2, wherein the receiver housing includes a plurality of a pair of beams spaced apart from one another, and wherein each of the plurality of arms of the pawl is positioned between a corresponding one of the plurality of the pair of beams, and wherein each of the plurality of arms of the stop is positioned between a corresponding one of the plurality of the pair of beams.

7. The pawl latch of claim 2, wherein the receiver housing includes a bearing located at the second end thereof, and the cam is movable rotatably about the bearing.

8. The pawl latch of claim 7, wherein the pin housing includes a bearing located at the second end thereof and is adapted to receive an external closing mechanism.

9. The pawl latch of claim 2, wherein the pin assembly includes a star wheel mated rotatably with the pin to adjust the axial travel of the pin along a longitudinal axis of the pin assembly.

10. The pawl latch of claim 9, wherein the pin housing includes a slot for accessing the star wheel, and the star wheel includes a periphery having a plurality of holes for receiving an external tool for rotating the star wheel.

11. The pawl latch of claim 10, wherein the pin housing includes a plurality of balls engaged with the star wheel, and a plurality of springs engaged with the plurality of balls for spring-loading the star wheel.

* * * * *